Figure 1:
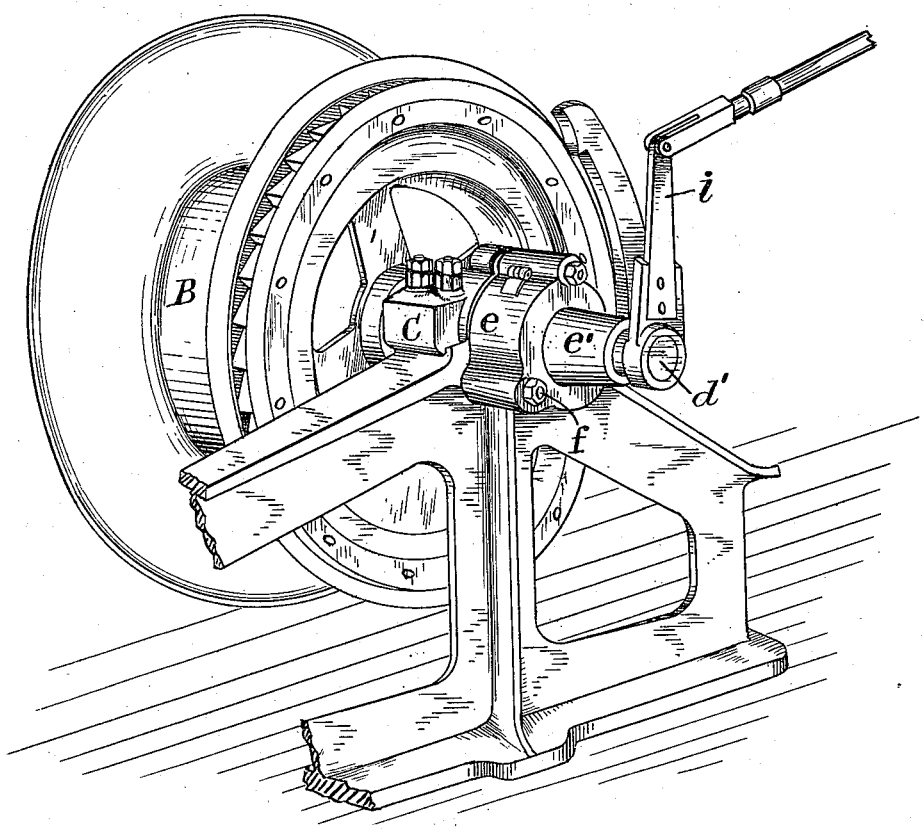

A. LAMBERT.
INTEGRAL NUT AND BEARING FOR FRICTION CLUTCHES.
APPLICATION FILED APR. 29, 1915.

1,157,232.

Patented Oct. 19, 1915.

A. LAMBERT.
INTEGRAL NUT AND BEARING FOR FRICTION CLUTCHES.
APPLICATION FILED APR. 29, 1915.
1,157,232.
Patented Oct. 19, 1915.
2 SHEETS—SHEET 2.
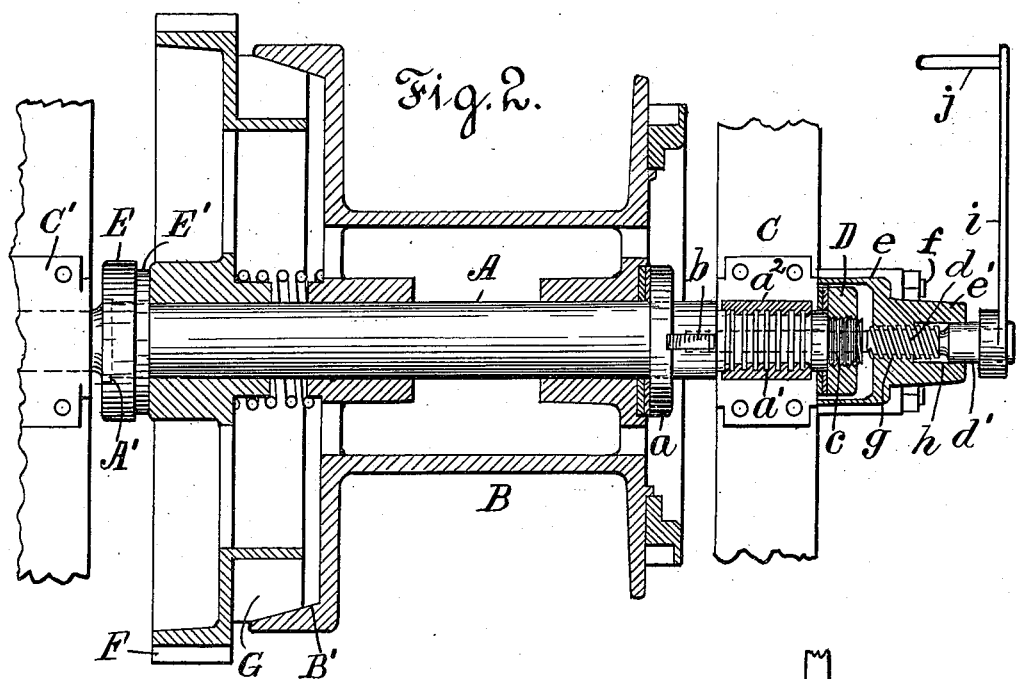
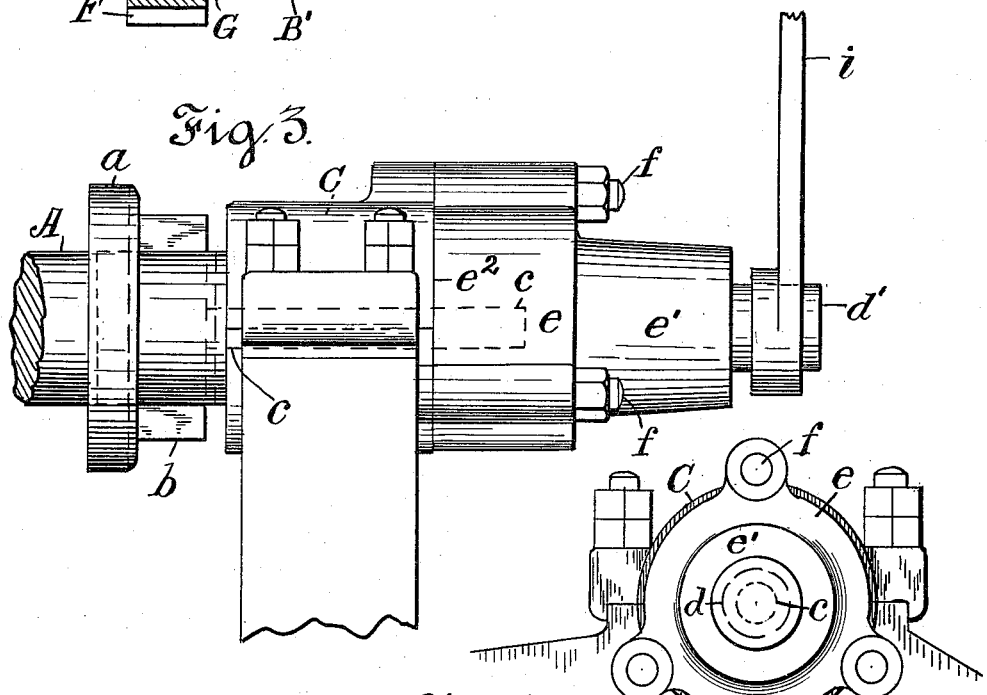

UNITED STATES PATENT OFFICE.

ASHER LAMBERT, OF NEWARK, NEW JERSEY.

INTEGRAL NUT AND BEARING FOR FRICTION-CLUTCHES.

1,157,232.

Specification of Letters Patent. Patented Oct. 19, 1915.

Application filed April 29, 1915. Serial No. 24,681.

*To all whom it may concern:*

Be it known that I, ASHER LAMBERT, a citizen of the United States, residing at 1 Johnson avenue, Newark, county of Essex, and State of New Jersey, have invented certain new and useful Improvements in Integral Nuts and Bearings for Friction-Clutches, fully described and represented in the following specification and the accompanying drawing, forming a part of the same.

This invention relates to an improvement in means for actuating the friction-clutch of a drum in a power hoisting-machine where it is necessary to connect and disconnect the drum with the power-driver positively and effectively, and at the same time with great facility. Heretofore, such a connection has been formed by fitting the drum to turn loosely upon a power-shaft which carried a friction-driver, and pressing the drum by means of a screw and hand-lever toward the friction-driver to rotate the drum when desired. Such screw-nut commonly extends outside the end of the drum-shaft and operates to press upon a pin movable in the center of the shaft and connected with a cross-piece and collar to transmit the pressure of the screw to one end of the drum; but the screw having no bearing except that afforded by the thread in the nut, and being pressed sidewise as a resultant of the lever-pressure which rotates it, is crowded forcibly toward one side of the nut with the effect of jamming it in the threads of the nut and wearing out the same with needless rapidity. The friction produced by such jamming also offers a great resistance to the rotating of the nut by the hand-lever, so that the effect of the screw is materially diminished in crowding the drum endwise.

The object of the present invention is to furnish a compact and simple construction for providing the stem of screw with a bearing outside of the nut, whereby the nut and screw-bearing are formed in one piece with a so-called "claw" attached to the outer side of the drum-shaft bearing.

The claw is formed with a hollow body to embrace a thrust-collar attached to the end of the shaft outside of the shaft-bearing, and carries an integral boss upon its outer end, which is formed at its inner end with a nut for the thrust-screw, and at its outer end with a cylindrical bearing for the stem of the screw to which the hand-lever is attached.

By forming the nut and bearing in one piece with the claw, the construction is greatly simplified and the bearing can be formed simultaneously with the thread in the nut, and thus in perfect axial alinement therewith.

The invention will be understood by reference to the annexed drawing, in which—

Figure 1 is a perspective view of a hoister-drum and its bearing to which the present improvement is applied; Fig. 2 is a longitudinal section of the drum and the claw, with the shaft, and one of the shaft-bearings opened; Fig. 3 is a side elevation of the shaft-bearing having the claw attached thereto; and Fig. 4 is an end view of the bearing and claw.

A is the drum-shaft fitted near its opposite ends to the shaft-bearings C and C'. Outside of the bearing C a shaft thrust-collar D is shown secured upon the end of the shaft, and a driver thrust-collar E is shown fitted against a shoulder A' upon the shaft inside of the bearing C'.

A driving-gear F is shown fitted to turn upon the shaft in the usual manner next the collar E with a loose washer E' between the two, and the gear is provided with a conical clutch-face G fitted to a hollow seat B' upon the drum.

A push-ring $a$ is fitted to the shaft inside the bearing C, and the usual cross-piece $b$ is fitted through the shaft against the push-ring, and a push-pin $c$ is fitted to a bore in the shaft extending from the cross-piece $b$ through the outer end of the shaft, where the inner end of the screw $d$ may press upon it.

The claw is shown with a hollow body $e$ adapted to fit over the shaft-thrust-collar D and secured to the outer side of the bearing by bolts $f$. The hollow body $e$ carries an integral boss $e'$ which is formed at its inner part with a nut $g$ for the body $d'$ of the screw. A hand-lever $i$ is shown secured upon the stem of the screw and provided with a handle $j$ for turning the same.

By forming the nut $g$ and the bearing $h$ integral with the claw, the nut and bearing may be formed in perfect alinement by turning in a lathe, and both are held in alinement with one another and with the push-pin $c$ by the single set of bolts $f$ which attaches the claw to the bearing C. The claw is fitted accurately to the faced seat $e^2$ upon the outer side of the bearing C, and the desired alinement is thus secured.

As the thrust of the screw is developed entirely by lateral pressure upon the lever $i$, it is evident that a strong lateral pressure is exerted against the stem $e'$ of the screw, which lateral pressure is wholly supported by the bearing $h$ and all lateral pressure upon the threads of the nut and screw is eliminated. The screw thus turns with much less frictional resistance to the power of the operator when moving the lever $i$, and the power is thus available to press the drum toward the driving-clutch.

The shaft where supported in the bearing C is turned with a series of grooves forming collars $a'$, which are fitted to a Babbitt lining $a^2$ in the bearing, and thus resist the end-thrust upon the shaft which is exerted against the shoulder A' when the drum is pressed by the screw toward the driving-gear F.

The shaft-thrust-collar D is super-added to prevent excessive wear of the grooves in the shaft or bearing where it is fitted to the bearing C, and the claw is made hollow to clear such shaft-thrust-collar when secured upon the end of the bearing.

Having thus set forth the nature of the invention what is claimed herein is:

1. In a hoister having a drum-shaft with bearings near its opposite ends and having a thrust-collar attached thereto outside of one of the bearings, the combination, with such bearing, of a claw having a hollow body to fit over the said thrust-collar, and having formed integral therewith a nut for a thrust-screw and a bearing for the stem of the screw outside of such nut.

2. In a hoister, the combination, with a drum-shaft with bearings near its opposite ends and having a thrust-collar attached thereto outside of one of the shaft-bearings, of a claw having a hollow body fitted over the said thrust-collar and attached to the said bearing and having a nut for a thrust-screw, with a bearing outside of the nut for the stem of the screw and a screw fitted to such nut and bearing and provided with a lever to turn the screw, the nut being relieved from the lateral pressure of the lever by the said outside bearing.

3. In a hoister, the combination, with a drum-shaft with bearings near its opposite ends and having a shaft-thrust-collar attached thereto outside of one of the bearings, of a driver-thrust-collar attached thereto inside of the opposite bearing, with a driving-gear rotatable upon the shaft adjacent thereto and a friction-driver attached to its inner face, a drum mounted to turn upon the shaft between the bearings and fitted to engage the friction-driver, a pin fitted movably in the opposite end of the shaft to press the drum endwise, and a claw having a hollow body fitted outside of the shaft-thrust-collar and attached to the adjacent shaft-bearing and having integral therewith a nut for a thrust-screw and a bearing outside of the nut for the shank of such screw, with a screw fitted to such nut and bearing and having a lever for turning the screw.

In testimony whereof I have hereunto set my hand.

ASHER LAMBERT.

Copies of this patent may be obtained for five cents each, by addressing the "Commissioner of Patents, Washington, D. C."